United States Patent [19]
Beausoleil et al.

[11] 4,087,794
[45] May 2, 1978

[54] MULTI-LEVEL STORAGE HIERARCHY EMULATION MONITOR

[75] Inventors: William F. Beausoleil, Hopewell Junction; Peter P. Hennet, Wappingers Falls; Klim Maling, Wappingers Falls; Norman K. Powers, Wappingers Falls, all of N.Y.

[73] Assignee: International Business Machines Corporation, Armonk, N.Y.

[21] Appl. No.: 320,393

[22] Filed: Jan. 2, 1973

[51] Int. Cl. ............................................ G06f 13/00
[52] U.S. Cl. ................................................. 364/900
[58] Field of Search .................... 340/172.5, 173 AM; 444/1

[56] References Cited
U.S. PATENT DOCUMENTS
3,675,215  7/1972  Arnold et al. ................... 340/172.5

Primary Examiner—Paul J. Henon
Assistant Examiner—Melvin B. Chapnick
Attorney, Agent, or Firm—Charles E. Rohrer

[57] ABSTRACT

A machine for emulating the results of multi-level storage hierarchies by providing an associative storage directory for each level other than main storage. Address sequences to drive the directories are derived from a single level digital computer by recording sequences on tape or by dynamically monitoring computer operation. Individual addresses are skewed an appropriate number of bits depending upon the block size and the number of classes being emulated at any given level, so that those bits of the monitored address indicating segment name are presented to the directory for comparison with its contents in the appropriate class. Means are provided for transposing the segment and class names at higher levels to segment and class names at lower levels. Counting means are provided to record hits, misses and pushes at various levels in order to provide data for calculating average access times for the particular multi-level storage hierarchy being emulated.

9 Claims, 16 Drawing Figures

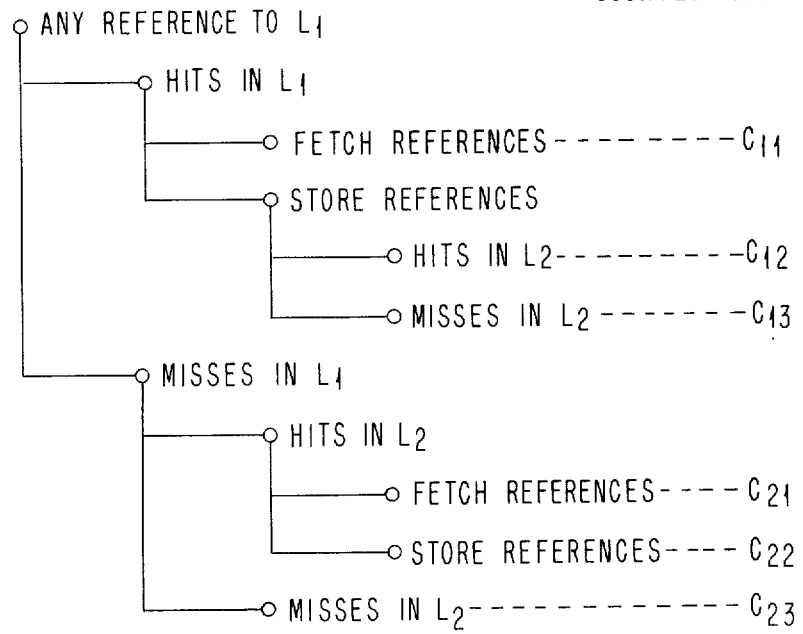
FIG. 1 COUNTER LOGIC FOR 3-LEVEL STORAGE HIERARCHY
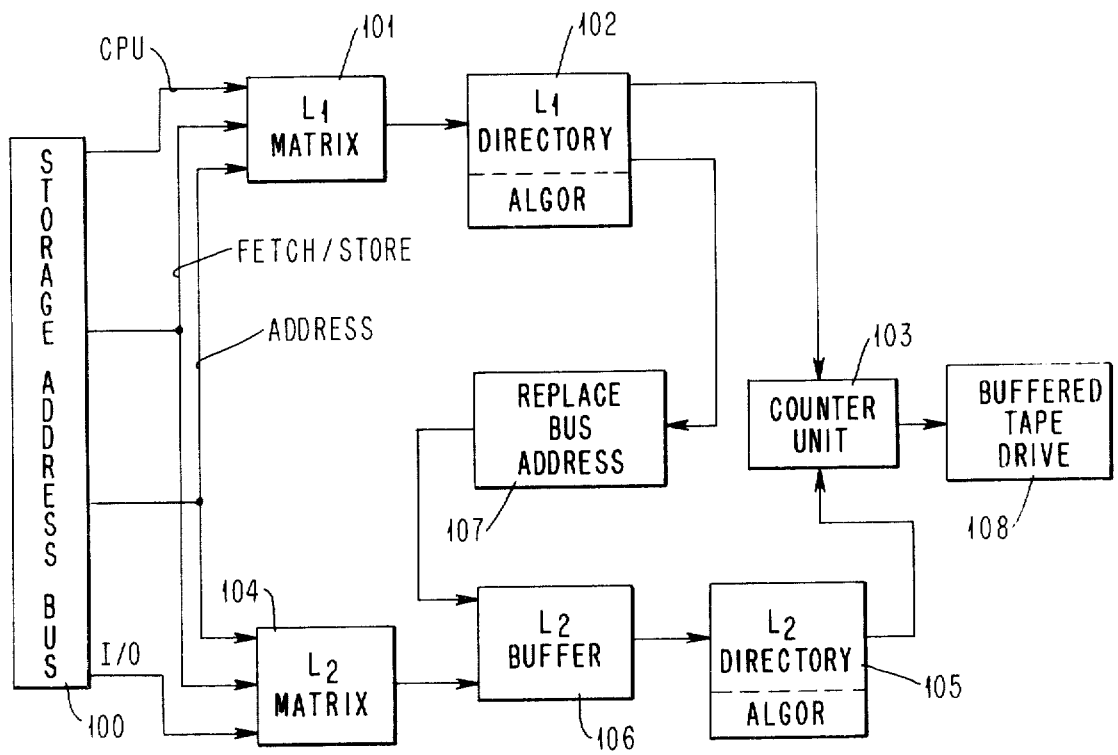
FIG. 3

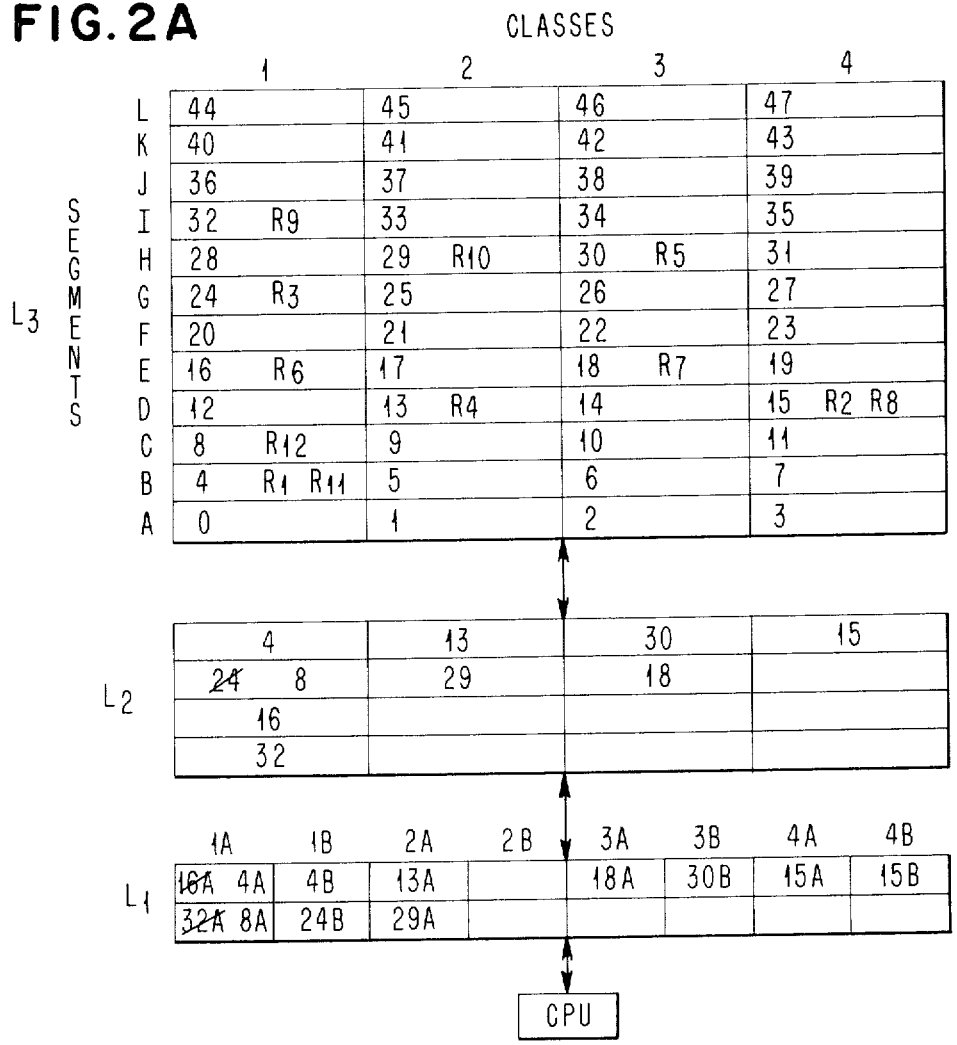

MULTI-LEVEL STORAGE HIERARCHY EMULATION MONITOR

This invention relates to data processing and more particularly to a machine for projecting the performance of proposed storage hierarchy designs. A related patent application, Ser. No. 320,222 filed concurrently herewith, reflects the contribution of another inventive entity to the machine.

BACKGROUND OF THE INVENTION

Most general purpose digital computing machines have been constructed through a central system organization in which the main storage is connected to outlying secondary storage such as disks, tapes, drums, etc. on one side and to the CPU on the other. Main storage itself often remains an essentially undivided bulk storage entity to the hardware, although to software in a multiprogramming environment it may be divided into regions or partitions in which programs are located during the executing period. It has been suggested that main storage should be hardware divided into hierarchical levels in which a small, fast access level would be directly connected to the central processing unit and larger, slower access backing levels successively connected to the first high speed level. U.S. Pat. No. 3,218,611 to Kilburn et al., assigned to the assignee of the present invention, is directed toward a hierarchical organization with directory registers for keeping track of where particular data is stored.

The need for hierarchies in main storage results from the need for memory to keep pace with CPU speeds while, at the same time, providing the large physical memory size demanded by the need to handle large problems. Unfortunately, large size and fast access speed are conflicting goals in the design of main storage, for as memory capacity increases, a larger physical package results which, in turn, causes an increase in transmission times. Thus, the hierarchical arrangement of main storage appears desirable to provide matching speeds between the main storage and the CPU.

In an article entitled "Concepts for Buffer Storage," C. J. Conti, IEEE Computer Group News, March 1969, the author describes four design variations in providing an hierarchicl arrangement. One of these arrangements has been implemented on System/360 Model 85 and is described as dividing main memory into sectors of 1,024 bytes and mapping these sectors into a fast acting buffer with a tag address associated with each sector. The sector is described as further divided into 64 byte blocks which, due to the design of System/360 Model 85, is close to the optimal transfer size of information for that particular computer. The addressing of such a scheme is provided by three low order bits to define a byte within a word, the next 3 bits to define the word, a 4 bit identifier for the block and a 14 bit identifier for the sector.

The author also describes three other mapping techniques and identifies the "set associative buffer" technique as the best of any of the four presented. In this technique both backing storage and buffer storage are divided into blocks with each block of buffer storage having a tag associated with it. Blocks in buffer storage are grouped into sets with, for example, two blocks per set. If buffer storage is large enough to contain 64 sets and if main memory is large enough to contain 16,384 blocks, then each set in the buffer storage can be associated with a specific 256 blocks in backing storage. At any instant of time, any of those 256 blocks may be in either of the two block positions in that particular buffer set. Thus by inspecting two tags in the set, it can be determined which of the 256 blocks are in the buffer. The effective address in this arrangement provides a low order 3 bits to identify the byte, the next three low order bits to identify the word, and the remaining 18 bits to identify the set and the tag.

In addition to selecting the type of mapping which must be built into the machinery to transfer information from a large capacity storage into a smaller storage, a replacement algorithm must also be provided; that is, when information in high speed storage is to be replaced by other information, the blocks must be replaced through random selection, by least recently used, or by some other replacement technique. An example of a replacement system may be found in U.S. Pat. No. 3,541,529, assigned to the assignee of the present invention.

Finally, a storage philosophy must be selected to define the manner in which information is to be stored. For example, if a Store-In-Buffer (SIB) philosophy is selected and if a target block is present in the first high speed buffer level of storage, the store is made with no other action. However, if the target block is not present at the first level, a pull is generated to succeeding levels in order to obtain the block. Pulls are propagated until the target block is found and then it is brought forward until it reaches the first level of storage where the store can then be made from the CPU to the buffer.

If a Store-Wherever (STW) philosophy is selected and if the target block is not found in the high speed buffer, a search is made to successively higher levels until the block is found. At that point, the CPU stores directly into the block at that level. There is no bringing the block upwardly to level 1 prior to the store.

A third storage philosophy may be the Store-Through (STH) technique where, when a block is present in the high speed level, the store is made there and then is also propagated to the next lower levels. Hence, if a trail of copies has been left in the various levels of storage, each level will be updated since the store will be propagated all the way down. If the block is not present in the high speed level, the store request is propagated to the next lower level and so on until the block is found. The store is made directly to the level at which the block is first found and from that point, a propagation is made through succeeding levels to update a trail of copies.

Thus, the performance of a multi-level storage hierarchy is responsive to many inter-dependent parameters at every level. These parameters include block size, number of blocks, the replacement algorithm, the storage philosophy, the ratio of access time, etc., but performance depends especially on the sequence of addresses generated during the performance of a job mix. If the sequence of generated addresses continually uses blocks of data already mapped into the high speed buffer, performance will be high. However, it will be degraded as it becomes necessary to obtain new blocks of information from lower levels of storage and map them into the high speed level in order to execute the job mix. The traditional prior art method of evaluating a hierarchy proposal is to drive a computer model of the hierarchy with an address sequence also called an address trace or trace tape. The disadvantages of this method lie principally in the difficulty of obtaining representative of undistorted address traces since virtually any program will become compute bound by tracing its execution. Thus, even though a particular job mix may be well balanced in terms of the I/O and CPU activities, when all jobs are traced, the environment becomes compute bound and it is impossible to obtain a realistic trace of the job stream. Additionally, some operations are timing sensitive and the imposition of a trace into the operation destroys its timing.

Thus, it is an overall objective of the present invention to provide a mechanism for testing the performance of various storage hierarchies against an undistorted address stream without actually implementing multi-level storage hierarchies by driving a system of directories which emulates particular storage hierarchies so that their performance can be predicted from the use of a single level general purpose computer such as a System/360 Model 65. In this manner, various hierarchical designs can be examined in relation to various job streams in order to determine which design provides the best performance over a widely varying range of job mixes.

SUMMARY OF THE INVENTION

The invention provides a directory for each level of storage other than main storage. The address stream of a single level computer is monitored and these addresses are converted to segment and class name indicators for a selected storage hierarchy. These means are then recorded in the appropriate directory according to a selected storage philosophy and updated as needed according to an appropriate algorithm. Counters are provided to record hits and misses at the various directories during the operational sequence.

BRIEF DESCRIPTION OF THE DRAWINGS

FIG. 1 shows a simple arrangement of counter logic for a three level storage hierarchy.

FIG. 2A provides a representation of a three level storage hierarchy in which the memory levels are divided into segments and classes.

FIG. 2B provides an address reference sequence for use with FIG. 2A.

FIG. 3 shows a connective view of each component in the inventive machine. The machine is shown connected to an address but on a host computer.

GENERAL DESCRIPTION OF THE INVENTION

Figure 4:
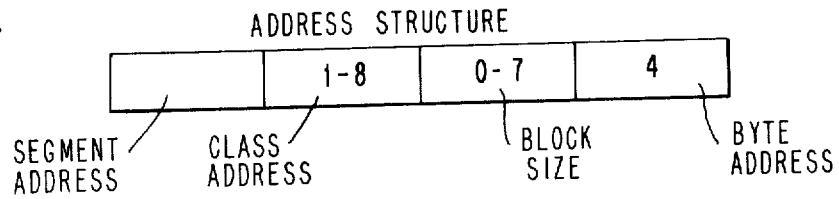
FIG. 4 provides the segment and class address structure to which a particular embodiment of the machine will convert input addresses.

This invention is implemented by providing a special purpose hardware monitor in which a directory is provided for each higher level of the proposed storage hierarchy. For example, the results in a three level storage hierarchy can be emulated by building a directory for the first level and a directory for the second level with counters provided in the monitor to track the hits and misses at the various higher levels according to the logic diagram shown in FIG. 1. The third or lowest level, which is the same as the large single level in a one-level storage, needs no directory or counters since it may be assumed to include all the referenced addresses.

The principle of the emulation machine will now be explained through a study of the counting logic and an inspection of formulas used to reduce the data obtained from the emulation machine to derive a measure of performance for the proposed multi-level storage under test. Counting logic is provided in the manner shown in FIG. 1 since there are three possibilities for fetch and three possibilities for store in a three-level hierarchy. These possibilities are: 1) the referenced block is present at all levels; 2) the referenced block is not at the first level; and 3) the referenced block is not in the first or the second level. Note that counter $c_{11}$ counts references in level 1 in which the block is present and in which the reference is a fetch. Counter $c_{21}$ counts fetch references which involve a miss at level 1 but a hit in level 2. Counter $c_{12}$ counts store references in which there is a hit level 1 and also a hit in level 2. Counter $c_{22}$ counts store references in which there is a miss in level 1 but a hit in level 2. Counter $c_{23}$ counts both fetch and store references which miss in both levels 1 and 2. In a multi-level computer storage designed with parallel architecture, that is, references may be made to each level in parallel, the access time for a fetch reference where the block is found at the lowest level is equal to the time involved for a store reference where the block is not found until the lowest level is reached. For computers with sequential architecture, there is a fetch/store distinction in access time and for those cases an additional counter $c_{32}$ would be needed so that counter $c_{23}$ might, for example, count only fetch references to the lowest level and additional counter $c_{32}$ would count store references to the lowest level. This may be illustrated by defining a time $t_1$ as the time to reference a block in level 1, time $t_2$ as the time necessary to reference a block in level 2, and time $t_3$ as the time necessary to reference a block in level 3. Thus the time it takes for a fetch reference to level 1 is $t_1$. However, in the Store-Through philosophy, the time it takes to execute a store would be the time necessary to update the copy at the lowest level. If the computer is designed for implementing its access to the various storage levels in parallel, the time for executing that store reference would be time $t_3$ since the copies at levels 1 and 2 would be updated simultaneously in a parallel architecture. However, in a sequential machine, the copy would be updated at level 1, then at level 2 and finally at level 3, so that the time necessary to complete the store operation would be $t_1 + t_2 + t_3$. Thus, a significant time difference can be noted for storage operations depending upon whether the computer storage is in parallel or in sequence.

Counter $c_{21}$ counts the fetch operations for blocks found at level 2. In a parallel implementation, the time necessary for the fetch operation would be $t_2$. In a sequential operation where the block first had to be brought to level 1 and then to the CPU, the time for the operation would be $t_2 + t_1$. In any case, the number of operations is counted by $c_{21}$ and the time taken is known through knowledge of the implementation under test.

Similarly, counter $c_{23}$ counts the fetch operation in which the block is first found at the lowest level. For a parallel operation, the time taken is $t_3$; for the sequential implementation, it is $t_3 + t_2 + t_1$.

In the Store-Through philosophy where the block is found at all three levels, it must be updated at all three levels. These operations are counted by counter $c_{12}$. Where the block is at the second and third levels only, the count is obtained on counter $c_{22}$. The number of store operations in which the block is found only at the lowest level are counted by counter $c_{23}$.

The above information is placed for ease of reference into the following table which includes the assumption that referenced blocks can be updated during transmission and that a copy of the block is always in the lowest level, $L_3$.

TABLE 1

| Access Time | | Counts | Fetch /Store | Block is in | | |
|---|---|---|---|---|---|---|
| parallel | sequential | | | $L_1$ | $L_2$ | $L_3$ |
| $t_1$ | $t_1$ | $c_{11}$ | F | 1 | 1 | 1 |
| $t_2$ | $t_2+t_1$ | $c_{21}$ | F | 0 | 1 | 1 |
| $t_3$ | $t_3+t_2+t_1$ | $c_{23}\,[c_{31}]$ | F | 0 | 0 | 1 |
| $t_3$ | $t_3+t_2+t_1$ | $c_{12}$ | S | 1 | 1 | 1 |
| $t_3$ | $t_3+t_2$ | $c_{22}$ | S | 0 | 1 | 1 |
| $t_3$ | $t_3$ | $c_{23}\,[c_{32}]$ | S | 0 | 0 | 1 |

Through these counters, we now have the information necessary to evalute the average access time on the monitored address stream for a three level storage hierarchy operating under a Store-Through philosophy. Although average access time will vary for the sequential case and for the parallel case, it is noted that the total number of counts times the average time is equal to the counts for individual cases multiplied by the times for those cases.

For the sequential case, it is necessary to replace counter $c_{23}$ by two counters, $c_{31}$ to count the fetch operations and $c_{32}$ to count the store operations. As explained above, this is necessary since the times for fetch and store are different in a sequential arrangement. Thus, average access time may be calculated from the formula $$c_n t = (c_{11}+c_{21}+c_{31})t_1+(c_{21}+c_{23}+c_{12}+c_{22})t_2+(c_{31}+c_{12}+c_{22}+c_{32})t_3$$

For the parallel case, the average access time is calculated from the formula $$c_n t = c_{11}t_1+c_{21}t_2+(c_{12}+c_{22}c_{23})t_3$$

Now let us suppose that the Store-In-Buffer philosophy had been selected instead of Store-Through. Time to accomplish the fetch operation is the same as before, but note that the store access times are equal to the fetch access times since, where the data block is not found in the high speed buffer, it generates a pull to bring the block up to the high speed buffer in the same manner as the fetch would operate. Hence, for all cases, times for storing information are exactly the same as times for fetching information. Table 2 below represents the information obtained in the counters utilizing a Store-In-Buffer philosophy with the assumption that if a pull requires a restore, these operations can be in the storage under test. Note that a restore is the pushing of a block to a lower level to make room for the block being pulled up. If this assumption does not apply in the machine being emulated, additional counters are needed.

TABLE 2

| Access Time | Counts | Fetch/Store | Block is in | | |
|---|---|---|---|---|---|
| | | | $L_1$ | $L_2$ | $L_3$ |
| $t_1$ | $c_{11}$ | F | 1 | 1 | 1 |
| $t_2$ | $c_{21}$ | F | 0 | 1 | 1 |
| $t_3$ | $c_{23}$ | F | 0 | 0 | 1 |
| $t_1$ | $c_{12}$ | S | 1 | 1 | 1 |
| $t_2$ | $c_{22}$ | S | 0 | 1 | 1 |
| $t_3$ | $c_{23}$ | S | 0 | 0 | 1 |

In calculating the average access time for this arrangement, let us assume that $t_1$ is less than $t_2$ which, in turn, is less than $t_3$, hence the average access time is calculated from the following formula $$c_n t = (c_{11}+c_{12})t_1+(c_{21}+c_{22})t_2+c_{23}t_3$$

Thus there has been described the necessary counters for obtaining information to be used in average access time formulas for deriving a measure of the performance of a multi-level storage hierarchy.

DETAILED DESCRIPTION OF THE INVENTION

Before describing a particular embodiment of the emulation machine, refer to FIG. 2, comprised of FIGS. 2A and 2B, which provides an illustration of an hierarchical storage which may be the subject of emulation showing the manner in which blocks of information are brought from the lowest level of main memory, $L_3$ through successive levels to the high speed buffer $L_1$ using a Store-in-Buffer philosophy. The set associative memory mapping technique is illustrated with the high speed buffer $L_1$ divided into eight classes, 1A, 1B, 2A, 2B, etc. The second level buffer $L_2$ is divided into four classes, 1, 2, 3 and 4. To illustrate the operation, assume that levels 1 and 2 are empty at the start of the memory references. FIG. 2B, the address sequence, shows that the first memory reference $R_1$ issued by the CPU is for an address found in block 4B. Since block 4, which includes block 4B, is located in class 1 of level 3, for a fetch or for a store in the Store-in-Buffer technique, block 4 is pulled out of level 3 and brought into class 1 of level 2. Then the B half of block 4 is brought into level 1 in class 1B for reference to the CPU. If the next reference, $R_2$, is to block 15A, block 15, found in class 4 of level 3, is brought up into class 4 of level 2 and from there 15A is brought into class 4A level 1. The third reference, $R_3$, is shown on FIG. 2B as being to block 24B. Therefore, block 24, which is found in class 1 of level 3, is brought up to class 1 of level 2 and block 24B from level 2 to class 1B of level 1. The fourth reference through the tenth reference result in similar operations, however, on reference 11 to block 4A it can be observed that now class 1A is completely filled in the high speed buffer. Consequently, before block 4A can be brought into the high speed buffer, one of the two blocks already there, 16A or 32A, must be displaced. If we are using a least recently used replacement technique, block 16A will be selected and will be replaced, as shown by the cross-out on FIG. 2A, by block 4A. Note that if 16A was changed during its residence in $L_1$, a restore operation is needed in order to update the copy in level 2 or level 3. Also, it should be noted that since block 4 had already been brought into level 2 on the first reference, it is unnecessary to go back to level 3 in order to find block 4A. It can simply be brought from the second level to the first level.

On the next reference, reference 12, which is to block 8A, a similar situation occurs since class 1A is filled with blocks 4A and 32A. Once again with the least recently used technique, block 32A would be displaced from level 1, as shown by the cross-out on FIG. 2A, in order to make room for block 8A. In this instance, since block 8 is not resident in level 2, reference must be made to level 3. Block 8 is brought up to displace the least recently used block in class 1 at level 2 which is block 24. In this manner, a hierarchical memory can be made to operate using the set associative memory mapping technique, a least recently used algorithm and a Store-In Buffer storage philosophy. It may be noted that if we were to emulate such an operation we would need a storage register (directory) capable of holding all the addresses of block data (segment name and class name) which could be stored at level 1 and a second directory which is capable of storing all of the block addresses (segment name and class name) in level 2. We would also need to monitor the address sequence from the storage address bus.

FIG. 3 shows an embodiment of the emulation machine of this invention which is capable of performing the above operations. The machine is attached to the storage address bus 100 of a single level digital computer which, to illustrate the invention herein, is an IBM System 360. This connection is made in order to derive the address stream of the computer and the connection may be made by means of probes which monitor each of the 24 bits comprising each address in the typical System/360 scheme. Assuming that a particular monitored address reference is a reference to storage from the CPU, the address is passed to the matrix circuit at 101, described in detail in FIG. 5, where the address structure is analyzed and broken into appropriate segment and class addresses according to settings of the segment and class switches, shown in FIG. 5, which are positioned to emulate a particular storage configuration such as, for example, the one shown in FIG. 2. It may be noted that the actual address monitored on the storage address bus is not indicative of segment and class addresses since the storage address bus is part of a computer with single level storage. However, according to the invention, each address can be viewed as though it contains a segment and a class in a hierarchical machine by looking at the address bits according to the structure shown in FIG. 4, and that is the function of the matrix circuits.

Figure 9:
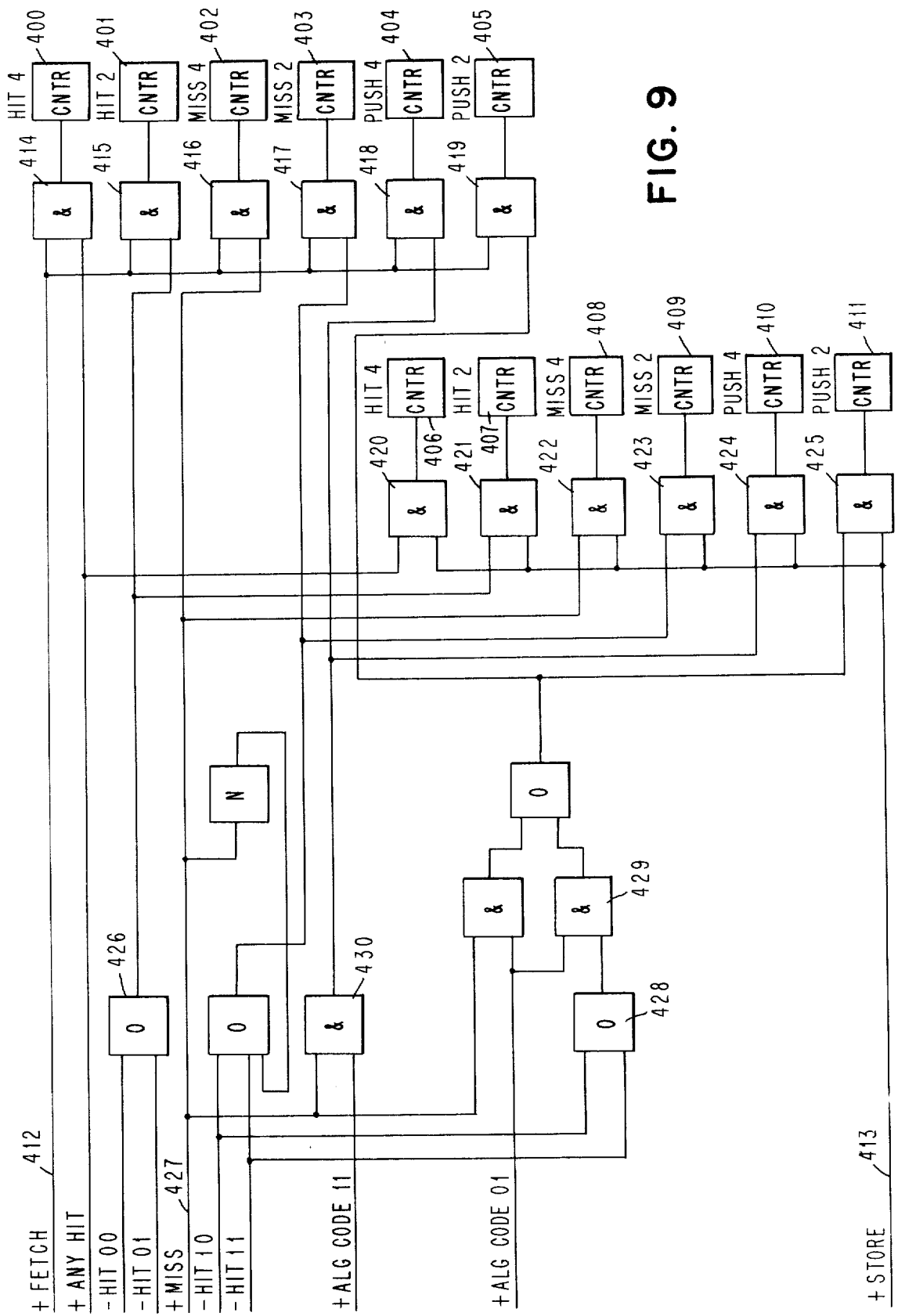
FIG. 9 and FIG. 10, comprised of FIGS. 10A and 10B, provide detailed counting logic for a particular machine embodiment.

Next, the monitored restructured address is compared to the contents of the $L_1$ directory 102 and if a compare is found, the appropriate counter signifying a hit is stepped at 103. If there is no hit in directory 102, the address is passed to the level 2 directory 105 where a comparison is made to determine whether the block is located at level 2. Again, appropriate counters are stepped signifying hits and misses at 103. Data from the counter unit may be read out to a storage medium such as buffered tape drive 108 or any other suitable storage medium. Counter logic may be as shown in FIG. 1 or may be more complex as shown in FIGS. 9 and 10, described below.

If the address on the storage address bus 100 is the result of an I/O operation, the address together with the fetch/store information is fed, in the embodiment shown in FIG. 3, into the $L_2$ matrix 104 where the function of splitting the address into segment and class designations is performed for entry into the $L_2$ directory. A comparison is again made with appropriate counters being stepped in the counter unit 103. Thus, in this embodiment of the emulation machine it is seen that CPU references are fed into level 1 and, if necessary, to successive levels of the emulated storage whereas I/O references are fed into the second level. This arrangement is shown since many multilevel storages use that kind of structure.

It should be noted that the $L_1$ directory and the $L_2$ directory can be class configured differently as shown in the example of FIG. 2. Consequently, the segment address and class address information fed into the $L_1$ directory for comparison may need to be changed to a different segment and class address for appropriate comparisons in the $L_2$ directory. Thus, when the miss condition occurs in $L_1$, the address structure may have to be reconstructed before it can be presented to the $L_2$ directory. Reconstruction is performed by the replace bus address generator 107, details in FIG. 11, which reconfigures the address structure to match the form it would have taken had the original storage address bus information passed through the $L_2$ matrix section. This reconstructed replace bus address and any addresses passing through the $L_2$ matrix are both fed into an $L_2$ buffer at 106 where they are interleaved in the proper order for entry into the $L_2$ directory. The $L_2$ buffer 106 is essentially a dual shift register which may be, for example, 8 positions deep by 26 bits wide. After stacking 8 inputs, one of the shift registers will then transfer all 9 inputs serially to the $L_2$ directory at maximum directory speed while the other shift register begins to accept inputs from the system input or $L_1$ replace bus at system speed.

Figure 5:
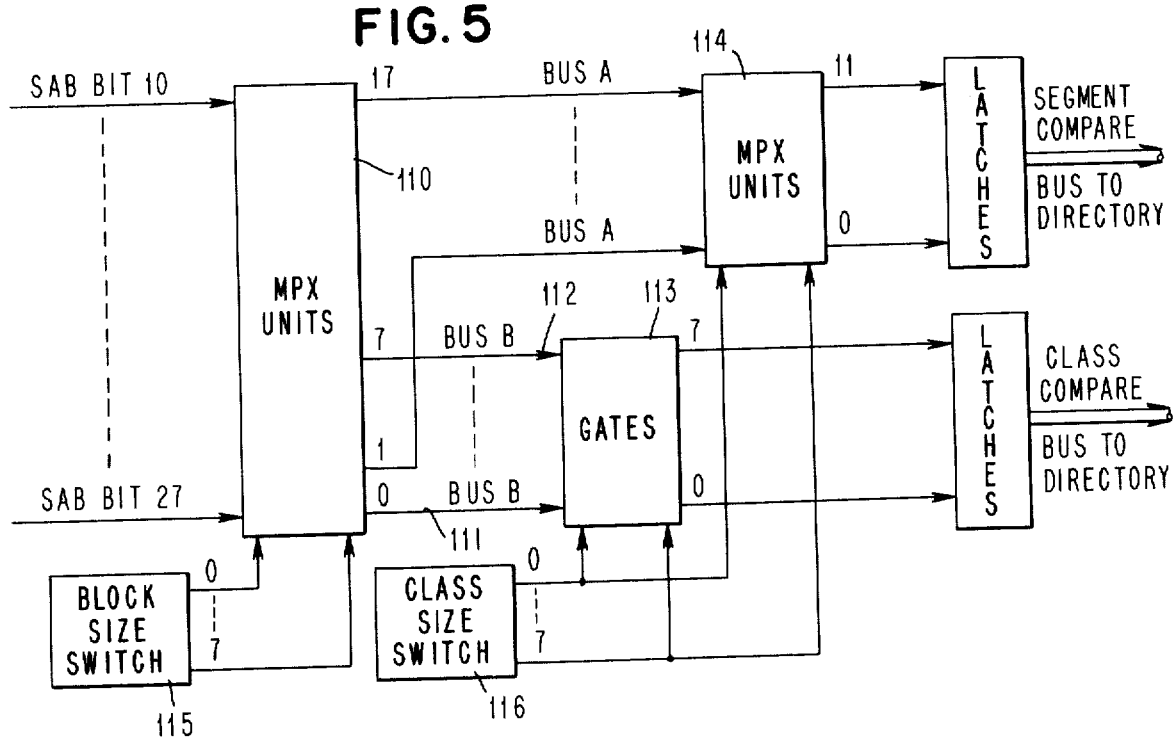
FIG. 5 shows the details of matrix units for selecting particular bits on the input address for segment and class names.

FIG. 5 illustrates the matrix arrangement which is identical for both $L_1$ and $L_2$. The address information is shown entering a multiplex unit 110 to which is connected an eight position switch 115 for setting the block size in the directory. If, for example, a selection of seven has been made on switch 115, bits 21 through 27 are discarded and bit 20 is gated to output on line 111. SAB bit 13 is then gated to line 112 and these eight bits are sent to the address gate 113. SAB bits 10 through 19 are gated to the multiplex unit 114. Another eight position switch, the class size switch 116, is connected to the address (AND) gates 113 so that if the number of classes selected for the directory is four, the first four out of the seven input bits to the address gate 113 are selected for output on the class compare bus. Thus, the class compare bus contains only the class address of the memory reference made on the storage address bus. Similarly, the selection of four on the class size switch inhibits the transfer of the first 4 bits out of multiplex unit 114. The remaining bits are output on the segment compare bus and contain only the segment address. The class name on the class compare bus is used to feed the information on the segment compare bus to the correct class in the directory for segment name comparison. The multiplex units, one for each SAB bit, are typified by standard commercially available components, such as Texas Instruments Ser. No. 74,151.

Figure 6:
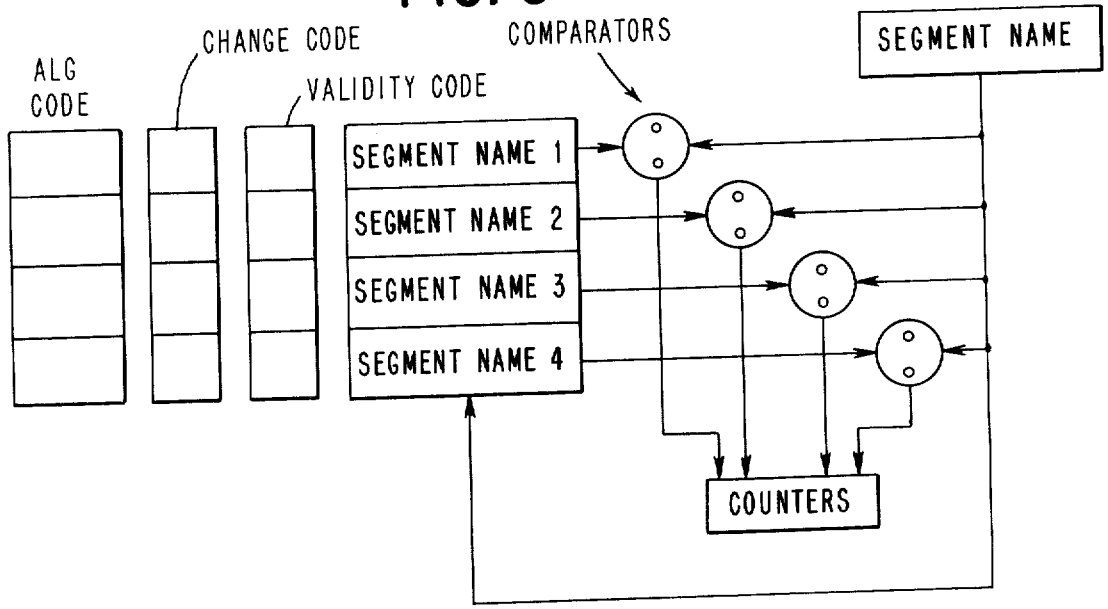
FIG. 6 is a diagram of a directory showing the basic compare and counting activities.

Referring now to FIG. 6, it is seen that for a four-way associative directory the segment address is compared to each of the four addresses currently in the selected directory class to determine whether a hit has been made.

FIG. 6 also shows that various information is stored together with the segment name in the directory. Validity bits signify whether the information in the directory is resultant from a reference during the present operational sequence. The change bit indicates whether the information designated by the address in the directory has been updated during the present operational sequence and the algorithm code could be, for example, a tag for the least recently used segment name in the directory.

Let us assume that the comparison of the segment name incoming on the compare bus to the segment name 1 in the directory results in a compare. That would raise a hit line which would step the appropriate counter according to selected logic such as shown in FIG. 1. This would be done, however, only if the valid bit was also set. Consequently, the output of the compare is ANDed with the validity bit in order to provide the hit indication. If the comparison operation for all segment names in the directory results in a no compare, a miss line is raised which is also the case where there is a compare but the validity bit has not been set. In either case, whenever a miss is determined, the next operation is to replace the least recently used (LRU) segment name (assuming an LRU algorithm) in the directory with the segment name on the bus. Consequently, the algorithm code is examined to determine the least recently used segment name in the directory and, in certain storage philosophies, the change code is also examined to determine whether an update operation is needed at a lower level storage. After initiating necessary update operations, the segment name on the bus is gated into the directory slot previously holding the least recently used segment name and the algorithm code is updated accordingly.

Figure 7:
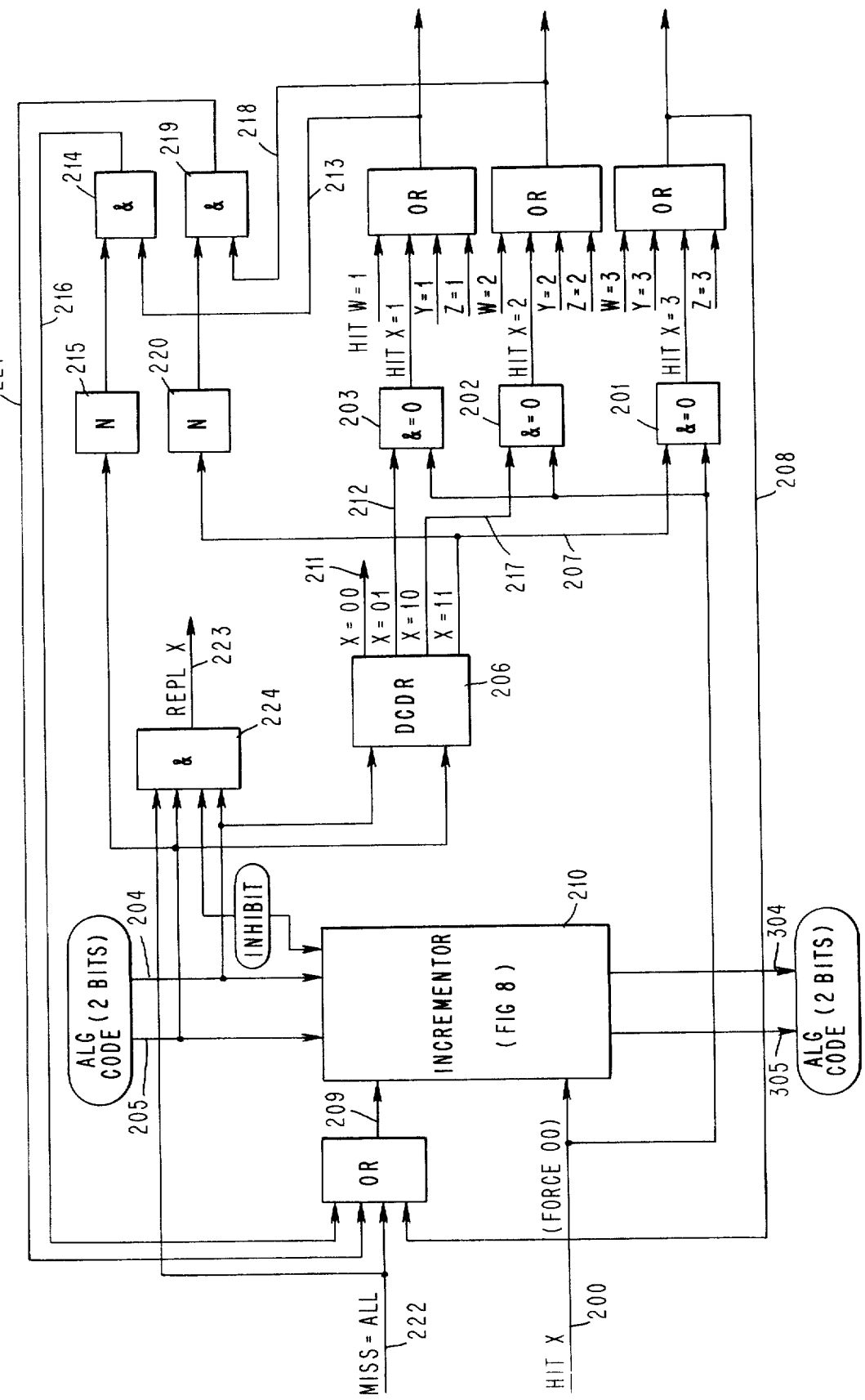
FIG. 7 provides the logic details of a least frequently used algorithmic circuit.

FIG. 7 shows the details of the LRU algorithm circuit. For ease of explanation, let us assume that segment name 1 in FIG. 6 is location W, segment name 2 is location X, segment name 3 is location Y and segment name 4 is location Z. Further, let us assume that a hit has occurred at location X as indicated on incoming line 200 in FIG. 7. Note that this raises an input to the AND circuits 201, 202 and 203. Further, let us assume that the two bit algorithm code for location X is 1 1; that is, X is the least recently used slot in the directory prior to this hit. Consequently, the operation of the algorithm circuit in FIG. 7 must reset the algorithm code for location X to zero and update each of the other locations by an increment of one. This operation occurs in the following manner. The algorithm code is input from storage on lines 204 and 205 which are connected into decoder 206. This input code to the decoder results in the raising of line 207 and thus satisfies AND circuit 201. This results in a raising of lines 208 and 209 providing input to the incrementor unit 210 described in detail in FIG. 8.

Figure 8:
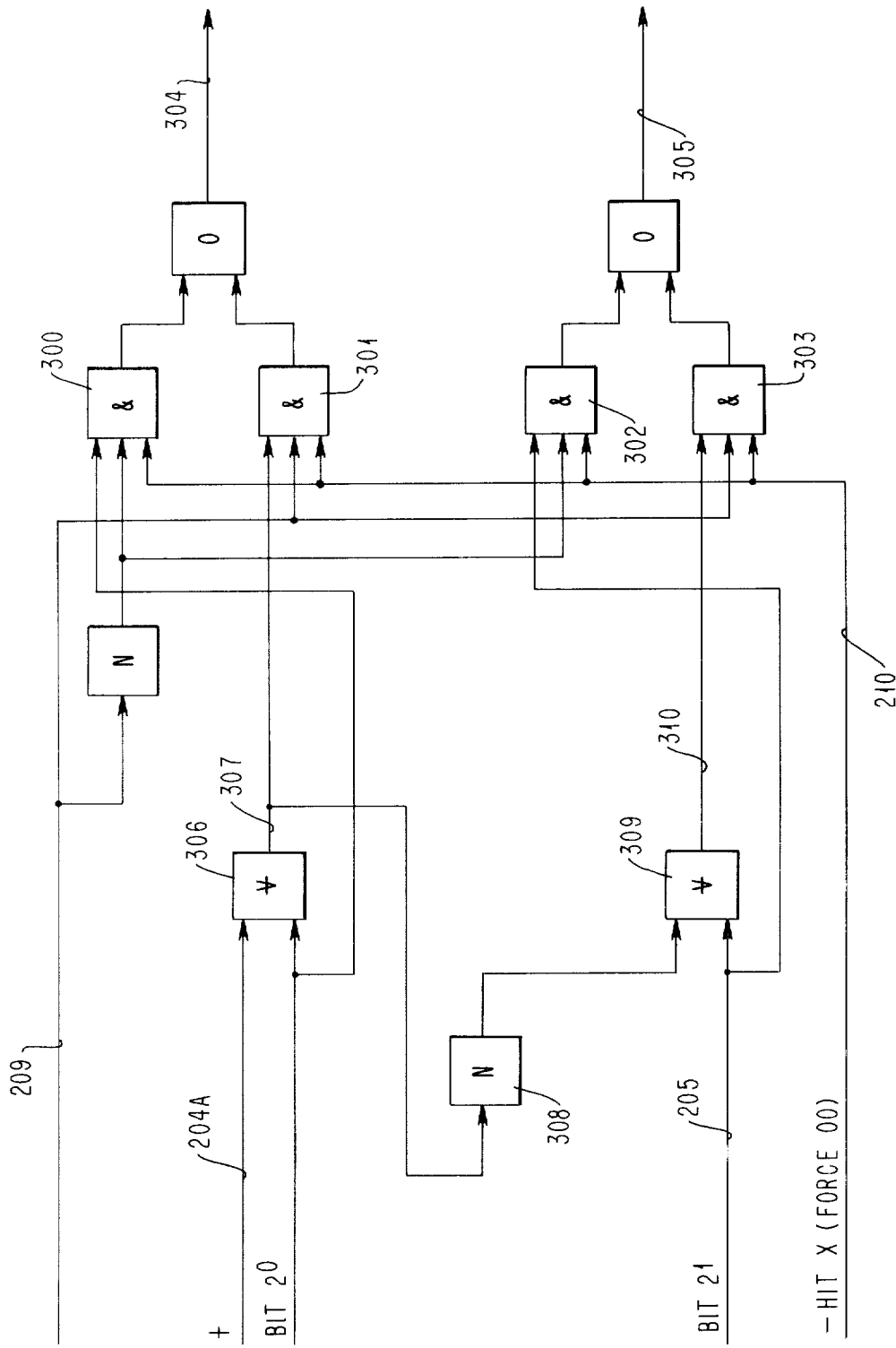
FIG. 8 illustrates an incrementor for use with the circuit of FIG 7.

Referring now to FIG. 8, it may be noted that line 209 raises inputs to AND circuits 301 and 303 while turning off inputs to circuits 300 and 302. For the X location, note that line 210 is turned off. Since line 210 is one of the inputs to each of the four AND circuits, it means that output lines 304 and 305 are off resulting in a 0 of a 0 0 two bit code into the algorithm code for location X.

For location W, line 210 is raised and, as already indicated, line 209 has been raised for AND circuits 301 and 303. Let us assume that the two bit incoming algorithm code at 204 and 205 for location W is 0 1. According to our previously stated objective, the output at 304 and 305 should be updated to 1 0; that is, updated to the binary equivalent of 2. A one input on line 204 is ANDed with the one input on line 204A and inverted by the AND invert circuit 306, resulting in a zero output on line 307. Thus, the AND circuit 301 is not satisfied and output line 304 produces a zero signal. The zero signal on line 307 is inverted at 308 creating a one input to circuit 309. This input is ANDed with the input bit zero on line 205, resulting in a failure to satisfy the AND invert circuit at 309, thus causing an output of one on line 310. In this manner, the AND circuit 303 is satisfied and line 305 is caused to contain a one output. Referring again to FIG. 7, it may be noted that lines 304 and 305 are fed back to storage for updating the algorithmic code for location W. In a similar manner, the codes for locations Y and Z will be updated.

Returning now to FIG. 7, it may be noted that if the incoming two bit algorithmic code for location X had been 0 0, that is, the hit had been on the most recently used location in the directory, no action is needed in regard to the algorithmic code. Thus, the line 211 indicating the hit is connected directly to the counting logic without any updating procedures in the algorithm circuit. However, if the algorithm code had been 0 1, line 212 would be raised creating an input satisfying condition on AND circuit 203 raising line 213 which is one of the inputs to AND circuit 214. The other input is the high order bit line 205 from the current algorithmic code at location X. Since it is a zero, it is inverted at 215 providing a satisfying condition for the inputs to AND circuit 214. Consequently, line 216 is raised together with line 209 as input to the incrementor circuit already described in FIG. 7.

Had the algorithmic code for location X been 1 0, line 217 would be raised in FIG. 7 satisfying AND circuit 202 and raising line 218 which is one of the inputs to AND circuit 219. The other input is provided through inverter 220 and since the algorithmic code is not 1 1, the line 221 is raised together with line 209 providing input to the incrementor.

Note that is the miss line 222 is raised and the algorithm code for location X is 1 1, the replace X line 223 is raised. Line 223 can then be used to gate the segment name on the compare bus in FIG. 6 into location X. Also, if the storage philosophy in use calls for an update operation at a lower level for changed data, the change code is gated with the miss line 222 to provide input to the replace bus address generator shown in detail in FIG. 11.

Counting logic can be as complex as desired and the very simple information obtainable through the logic shown in FIG. 1 may not suffice for all purposes. FIG. 9 shows a counter logic for level 1 providing the ability to emulate two or four way associativity in the same run. Note that counters 400 to 405 count fetch references through the fetch line 412 input to AND circuits 414 through 419. Counters 406 through 411 count store references through store input line 413 together with AND circuits 420 through 425.

Considering the operation of the circuit for fetch references, note that if there is any hit in the directory, circuit 414 is satisfied and the counter 400 is stepped. If the hit occurs in either of the first two levels of associativity, OR circuit 426 is satisfied and counter 401 is stepped. Thus, if the hit is in either of the lower two levels of associativity, counter 401 is not stepped. If a miss condition is obtained at all four levels of associativity, counter 402 is stepped through the raising of line 427. If a hit occurs in either of the two lower levels of associativity, OR circuit 428 is satisfied thus providing an input to AND circuit 429. If an inspection of the four algorithmic codes indicates that 0 1 condition is present, this means the first two levels of associativity are filled and the hit has occurred in the third and fourth levels of associativity. Hence, the miss at the first two levels has caused a need to replace the least recently used of those two segments. This condition satisfies AND circuit 429 resulting in stepping the counter 405. In this manner, counter 405 counts the number of pushes for a two way associative directory. Note that counter 403 is also stepped since the hit at one of the lower two levels of associativity would satisfy the AND circuit 417. Counter 404 is stepped if the miss is to all four levels of associativity and the algorithmic code indicates that all four levels are in use during this operational sequence. This is performed through AND circuit 430 which is satisfied by a miss condition on all four levels and an indication that one of the algorithmic codes contains a 1 1.

The operation of the store counters 406 through 411 is identical to the operation of the fetch counters and hence, will not be described.

Figure 10A:
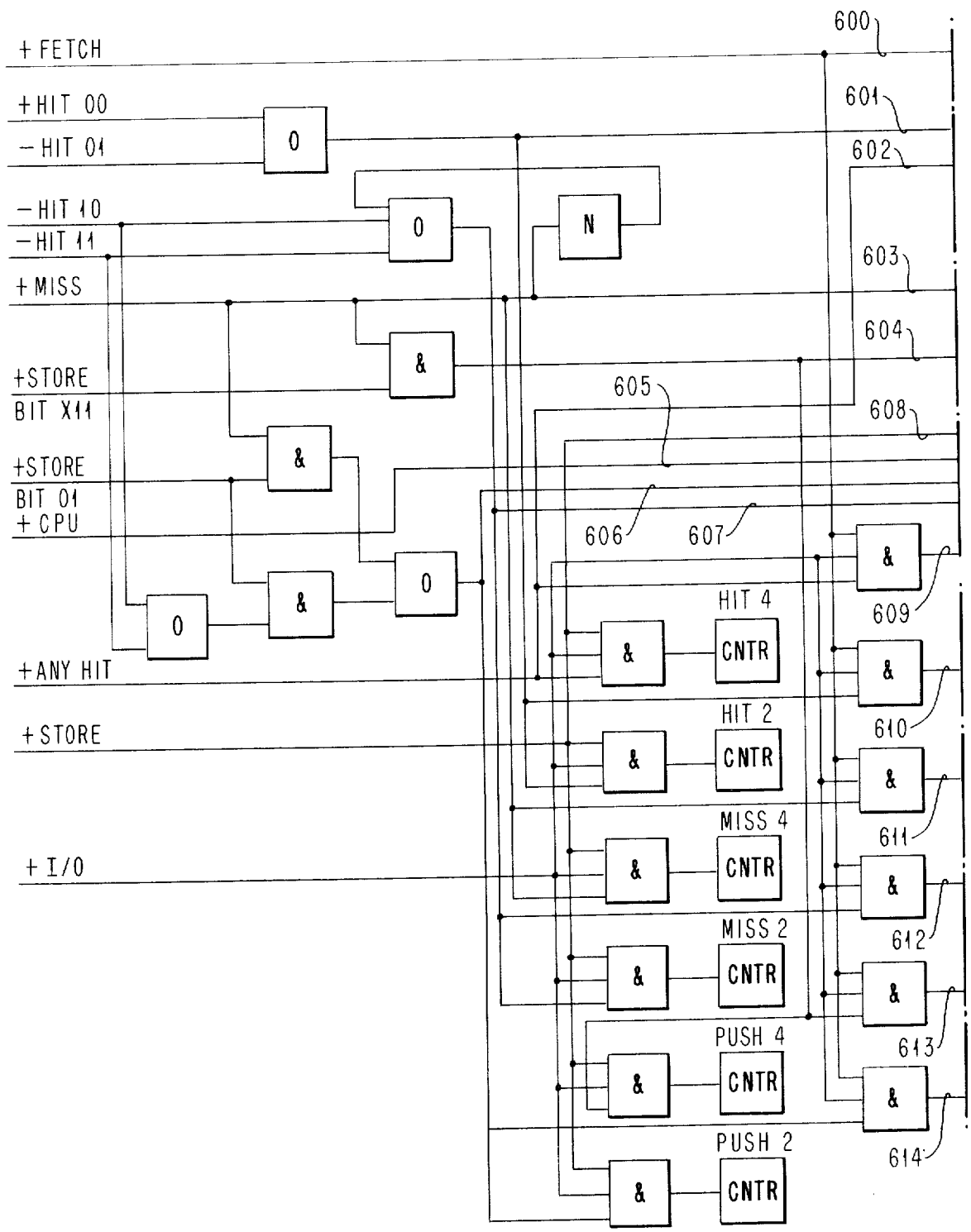
Figure 10B:
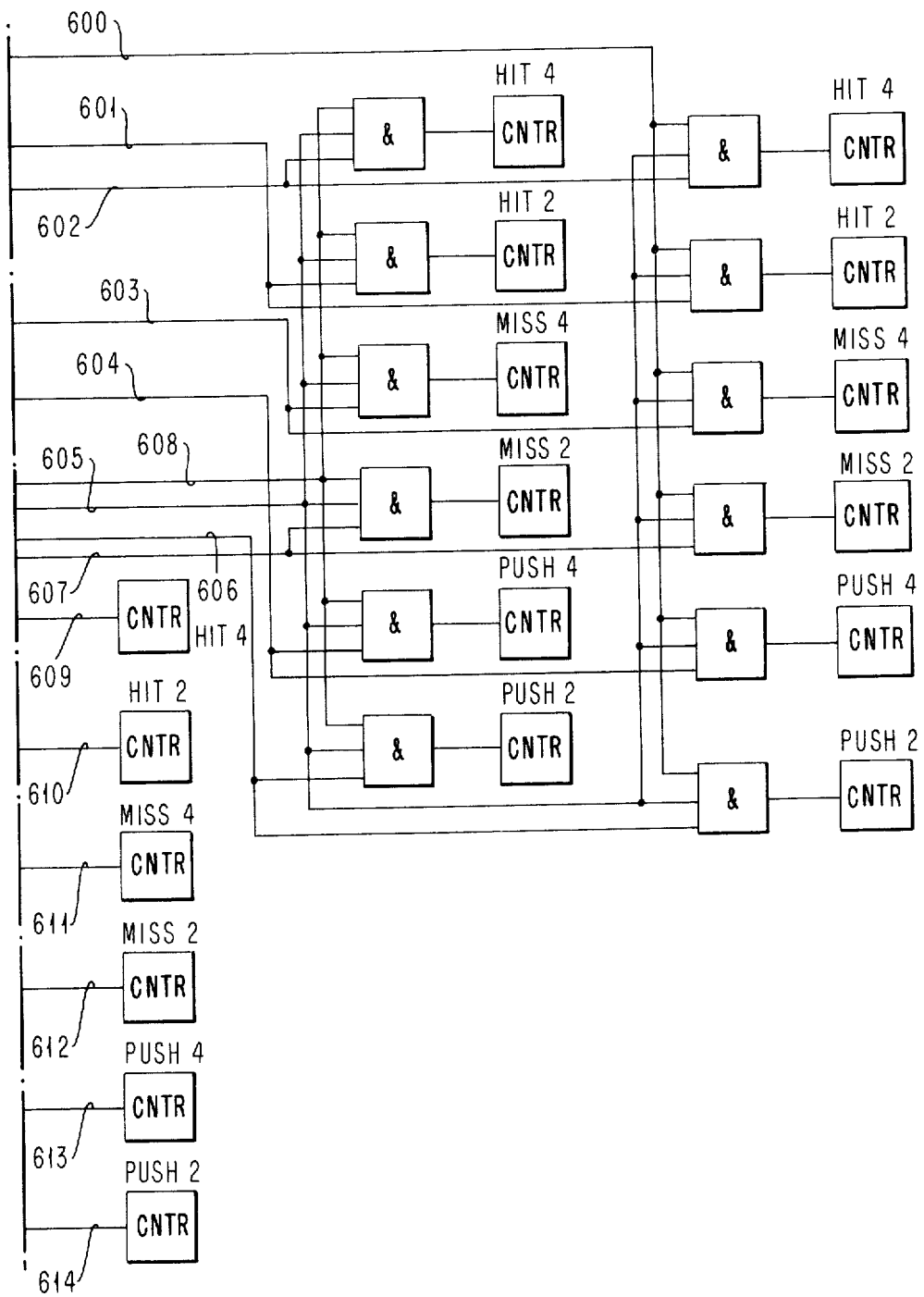

FIG. 10 comprised of FIGS. 10A and 10B, shows the counter logic for level 2 and is identical to the counter logic shown in FIG. 9, however, there is an additional set of counters since I/O operations are emulated for an entry to the system at level 2. Thus, level 2 counter logic must count fetch and store references to level 2 when the CPU originates the reference and must also count fetch and store references where it is an I/O operation which originates the reference. Note, however, that no provision is made for emulating both two way and four way associativity at level 2 in the same run. Lines 600–614 are identified in both FIGS. 10A and 10B to provide ease in tracing the circuit.

Figure 11:
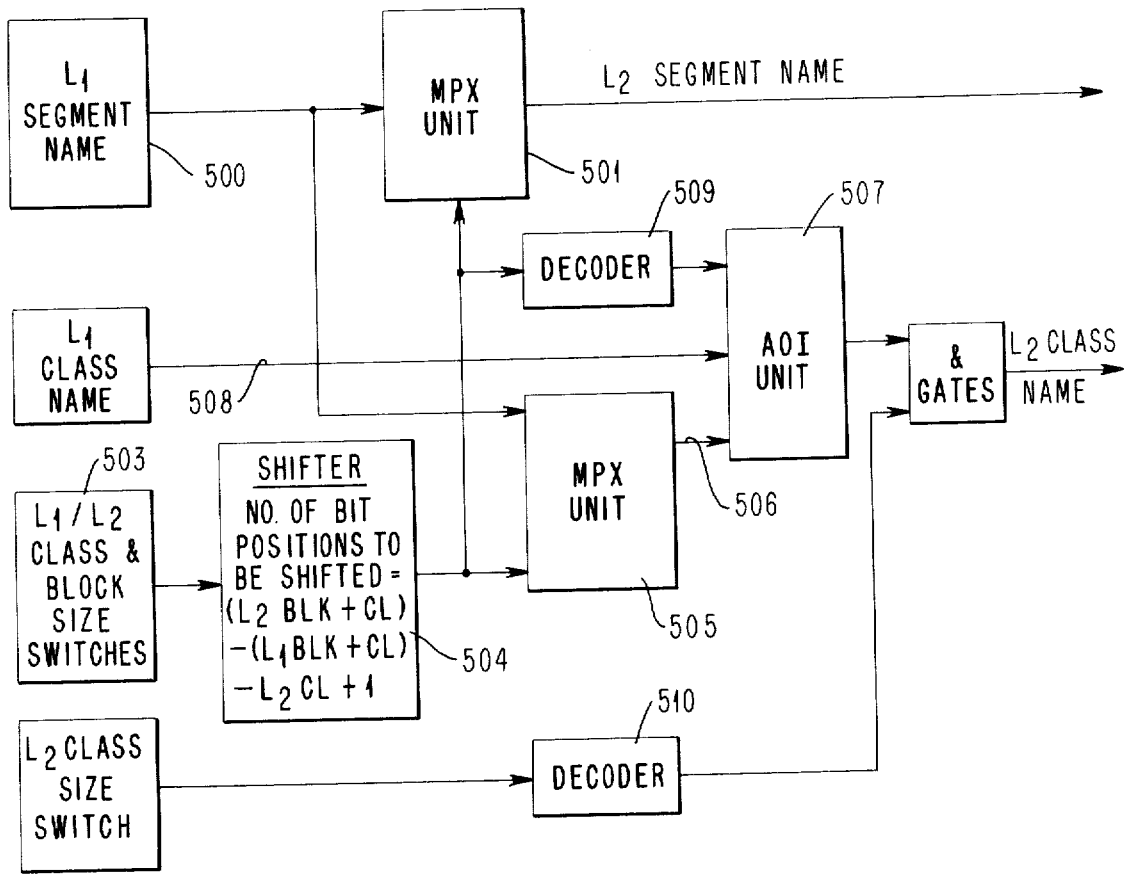
FIG. 11 shows the details of the replace bus address component of FIG. 3.

FIG. 3 shows a replace bus generator 107 which reconfigures the segment name and class name found in the level 1 directory for entry into the level 2 directory when a push operation causes the address in the level 1 directory to be pushed into the level 2 directory. As we have already noted, the two directories may be configured differently, that is, there may be more classes in level 2 than in level 1. Thus, the monitored address on the storage address bus is configured differently by the multiplex circuit arrangement of FIG. 5 when the information is being fed to level 1 that it is when it is being fed to level 2. This creates the need for the replace bus generator 107, details of which are shown in FIG. 11. An example of corresponding addresses is shown in FIG. 12.

Figure 12:
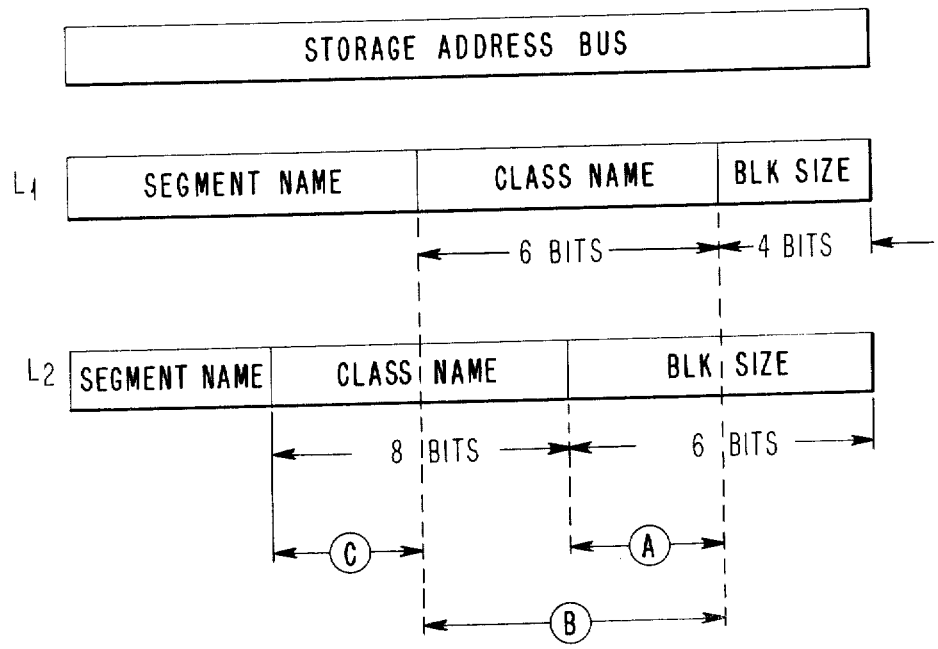
FIG. 12 illustrates the address conversion problem between levels.

In FIG. 12 note that the class name at level 1 occupies a specific 6 bits of the monitored address found on the storage address bus. When that address is reconfigured for the level 2 scheme, the class name will be 8 bits wide and will occupy a different portion of the monitored address from the storage address bus. We may note that the low order bits marked A incoming from the level 1 scheme can be discarded and the high order bits marked C must be added in order to make up the new class name.

Referring now to FIG. 11, note that the segment name from the $L_1$ directory is placed on the replace bus at 500 and fed to a multiplex unit 501. This unit is the same type of device used in the matrix circuit shown in FIG. 5, and its function is identical, that is, to receive the input of the class size switch for level 2 and gate the desired bits to the output bus. Actually the number of bits to be shifted in this case is determined by more than just the class size switch at level 2 as shown by the shifting algorithm at 504. The four configuration switch inputs for level 1 and level 2 shown at 503 are inputs to the shifter and are combined in the manner shown in 504 to determine the number of positions which need be shifted by the multiplex unit at 501. This information is also placed into the multiplex unit 505 which performs in a reverse manner to the unit shown at 501, that is, the unit at 505 will pass the high order bits in the segment name (those bits designated by C in FIG. 12) to output bus 506. These bits will comprise the high order bits of the class name for level 2 and will be combined with the proper low order bits in the and/or invert logic circuit 507. The low order bits for the class name are provided over line 508 which contains bits comprising the class name in level 1. Thus, for example, if the class name from level 1 comprised 6 bits and the output of the multiplex unit 505 was 4 bits, these 10 bits would provide input to the and/or invert unit 507. The decoder unit 509 receives as input the number of bits to be shifted and as output provides gating inputs for the 4 bits from multiplex unit 506 and gates the 4 high order bits from line 508. Thus, the 8 bits which are potentially a class name at level 2 are provided as output from the and/or invert circuit 507. Decoder 510 receives as input the class size of level 2 from the $L_2$ class size switch and provides a gating input for the proper number of bits for the class name in level 2. In the example shown in FIG. 12, all eight bits from the and/or invert circuit would be gated to the output class name bus. Thus, a circuit is provided to produce the segment name and the class name for level 2 where a push operation has generated a transfer of the segment from level 1 to level 2.

It is noted that the decoding and AOI units may be standard commercially available units such as Texas Instruments, SN 7442 and SN 7451, respectively.

Figure 13:
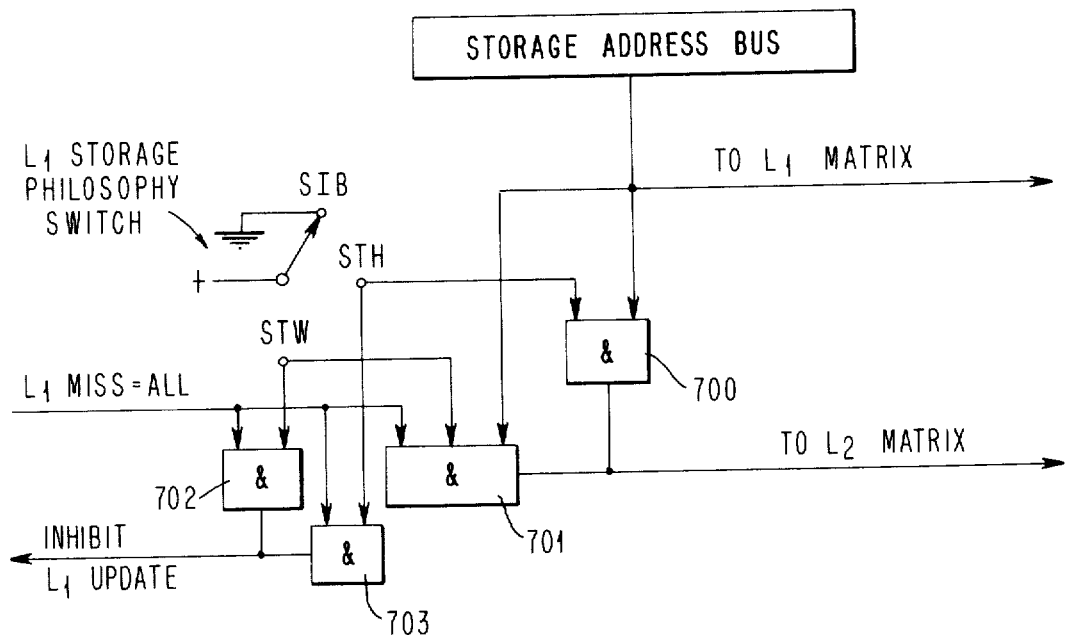
FIG. 13 shows a switch arrangement for selecting storage philosophies.

The capability of testing different storage philosophies is easily accommodated in the machine. FIG. 13 illustrates the logic needed to operate the machine for the Store-In-Buffer, Store-Through and Store-Wherever philosophies. In the Store-Through scheme, the monitored address on the storage address but is sent to each level and if the address is found at that level, the information is updated. In the machine of the instant invention, that is provided through a simple AND function 700 which provides a gate for the storage address but to the $L_2$ matrix. For the Store-Wherever philosophy, the storage is made at $L_1$ if the address is found there and no other action is taken. However, if there is a miss in $L_1$, $L_2$ must be examined to determine whether the information is found at that level. This philosophy is implemented through AND circuit 701 in which the level 1 miss = all line is ANDed with the storage address bus to gate the bus to the $L_2$ matrix. It might also be implemented through the replace bus generator mechanism but in either event, the Store-Wherever storage philosophy calls for no change in the information stored at level 1 in the miss case. An inhibit signal must be provided so that the algorithmic code is not updated at level 1. This is accomplished through AND gate 702 which provides an inhibit signal for the incrementor 210 and the gate 224 in FIG. 7. Since Store-Through also calls for no changes at $L_1$ in the event of a miss, circuit 703 is provided which also produces an inhibit signal.

Figure 14:
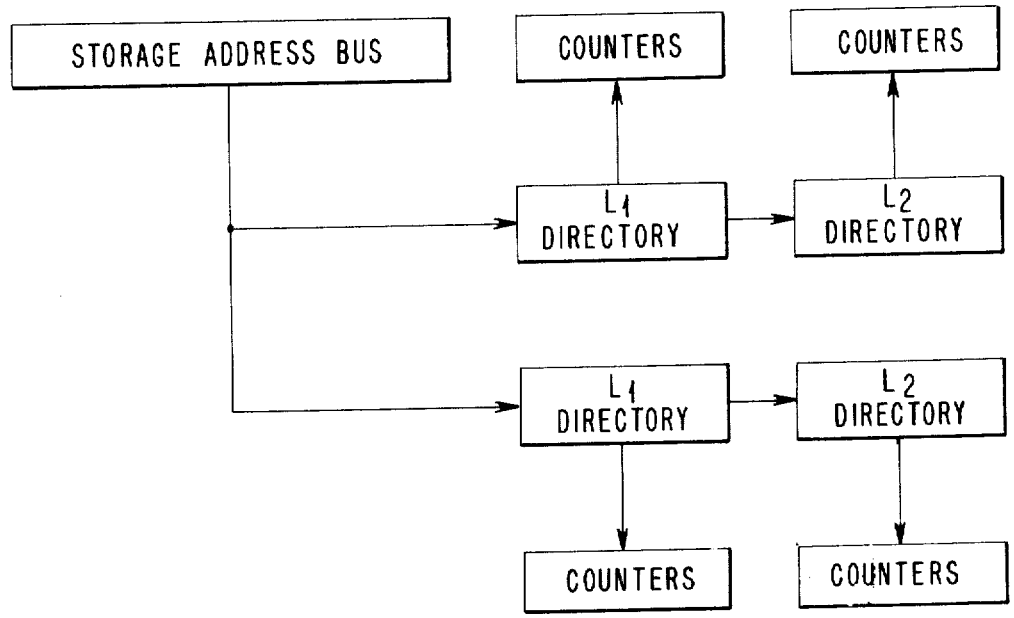
FIG. 14 shows an embodiment providing simultaneous test capability on more than one philosphy.

The most desirable configuration for machines of the instant type is to duplicate the directories for level 1 and level 2 as shown in FIG. 14. In this manner, two storage philosophies can be tested against one another for exactly the same monitored address stream. Without the dual capability shown in FIG. 14, storage philosophies must either be tested on different address streams during different runs or else they must be tested through an address trace tape rather than dynamically through the storage address bus. The difficulties already mentioned in regard to the accuracy of an address trace tape render the configuration shown in FIG. 14 desirable.

The skilled artisan will recognize other variations which can easily be installed into the instant machine. For example, an algorithm circuit implementing a most frequently used algorithm could be used in place of the least recently used technique described herein. Additionally, both algorithmic circuits could be provided in the machine with a switch to select one or the other. Thus, the capability of combining different storage philosophies with different algorithms could be accomplished. Additionally, the simple storage philosophies outlined herein can be made more complex with additional logic capabilities provided to emulate these complexities. Also, storage philosophies can be different at different levels of storage, for example, FIG. 13 shows a storage philosophy switch for $L_1$; however, an identical switch can be provided for $L_2$ so that a particular storage philosophy can be selected for level 1 and a different storage philosophy selected for level 2.

While the invention has been particularly shown and described with reference to preferred embodiments thereof, it will be understood by those skilled in the art that the foregoing and other changes in form and details may be made therein without departing from the spirit and scope of the invention.

What is claimed is:

1. For use with an address sequence produced from a computing system having a single level storage, a system for obtaining data for use in computing average access times for completing storage reference operations in a multi-level storage hierarchy, comprising
    emulation means for emulating each hierarchical level in said multi-level storage other than the main storage level by receiving said address sequence and recording the segments of storage located at each of said emulated levels,
    counting means connected to said emulation means to provide a record of hits and misses for fetch and store memory references from said address sequence at each of said emulation means, and
    address generation means connected between emulation means for adjacent levels for transferring a displaced segment of storage at a higher level to a lower level where said displaced segment is pushed out of said higher level by the need to record a segment received from said address sequence.

2. The system of claim 1 wherein said counting means includes additional counting means to provide a record of pushes from said higher level.

3. The system of claim 2 in which each of said emulation means include associative storage directories for class recording segment names derived from said address sequence.

4. The system of claim 3 in which said emulsion means further include comparator means for comparing segment names derived from said address sequence to segment names in the appropriate class of said directories and circuit means to update said directories in accordance with a selected storage philosophy and a selected updating technique.

5. The system of claim 4 wherein said emulation means further include
    means for obtaining a copy of each address in said address sequence and where said address was generated from CPU activity, means for passing a selected portion of each said address to at least a highest level directory, and where said address was generated from I/O activity, means for passing a selected portion of each said address to a selected lower level directory.

6. The system of claim 5 wherein said counting means include designated counters to provide a record of hits and misses resultant from I/O references.

7. The system of claim 6 wherein each of said emulation means further include a first switch means to set the number of classes and a second switch means to set the memory block size so that each of said hierarchical levels may be configured differently.

8. The system of claim 7 wherein said counting means includes counters at the highest level to count hits and misses for a two-way associative storage directory and other counters to simultaneously count hits and misses for a four-way associative directory so that more than one degree of associativity can be emulated in a single run.

9. The apparatus of claim 8 including switch means to select a particular storage philosphy for a particular storage level.

* * * * *